United States Patent [19]
Nordstrom et al.

[11] 3,872,954
[45] Mar. 25, 1975

[54] CLUTCH AND BRAKE ASSEMBLY

[75] Inventors: Leroy A. Nordstrom, Racine; Peter D. Ruffalo, Kenosha, both of Wis.

[73] Assignee: J. I. Case Company, Racine, Wis.

[22] Filed: Apr. 19, 1974

[21] Appl. No.: 462,588

[52] U.S. Cl. ............................................. 192/18 A
[51] Int. Cl. .............................................. F16d 67/04
[58] Field of Search .................................. 192/18 A

[56] References Cited
UNITED STATES PATENTS

| | | | |
|---|---|---|---|
| 3,035,458 | 5/1962 | Wickman | 192/18 A |
| 3,303,726 | 2/1967 | Christenson | 192/18 A |
| 3,468,402 | 9/1968 | Edwards | 192/18 A |

Primary Examiner—Benjamin W. Wyche
Attorney, Agent, or Firm—Arthur J. Hansmann

[57] ABSTRACT

A clutch and brake assembly having a housing enclosing a driving member and a driven member with interposed clutch plates. A clutch control member moves the driven member out of driven relation with the driving member, and a brake member is supported on the housing that has a conically-shaped brake surface which engages a conically-shaped brake surface on the driven member. The brake member is subjected to fluid pressure for its braking action, and springs are in contact with the brake member for releasing it from the braking position with the driven member. A power-take-off shaft is in driving relation with the driven member.

5 Claims, 2 Drawing Figures

CLUTCH AND BRAKE ASSEMBLY

This invention relates to a clutch and brake assembly, and, more particularly, it relates to a clutch and brake assembly which commonly includes clutch plates and a power-take-off shaft and a driven member, all of which must be abruptly stopped in their rotation when braking action is desired.

BACKGROUND OF THE INVENTION

The prior art includes structures of braking mechanisms which are useful in stopping rotation of a clutch type of assembly, and examples of such are shown in U.S. Pat. Nos. 2,930,460 and 3,209,872 and 3,669,229. This prior art generally includes a clutch member having interengaging clutch plates, and a brake member is provided for operating on the driven member, either by mechanical or hydraulic pressure applied to the brake member for stopping the rotation of the driven member when the clutch is disengaged. In these arrangements, the clutch and brake assembly has parts which create substantial momentum in their rotation, and it is a problem and concern to bring the driven parts to a quick and firm non-rotating condition. Accordingly, it is important that the brake be efficient and reliable in its operation, and the present invention has as its primary objective the achievement of this goal.

Therefore, the present invention provides a clutch and brake assembly which is included in a housing and wherein the brake member can be conveniently and efficiently operated and it is provided with a braking surface which effectively engages the clutch driven member and brings the driven member, along with the driven output shaft, to a quick and effective stop in its rotational action.

Another object of this invention is to provide an efficient brake and clutch assembly wherein the housing for the assembly is available and utilized in guiding the movable brake member and is also arranged, along with the brake member, to receive fluid under pressure and thereby move the brake member into operative position with the driven and rotating clutch parts to effectively stop the rotation.

In accomplishing the aforementioned objectives, it is also a beneficial consequence of this invention that the brake member has an annular brake surface which engages a corresponding annular surface on the driven member, and the brake member is moved under fluid pressure in a completely evenly distributed manner, all so that the brake member can apply a firm and uniform pressure to the driven member and thereby bring it to an efficient and firm stop in its rotation. Further, the return of the brake member to the non-braking or inoperative position is achieved by springs which do not need any adjustment and the brake member again remains in a desired aligned position while moving relative to the driven member, and thus reliable and efficient action is accomplished.

Further, the brake and clutch assembly of this invention are self-adjusting in that the parts do not wear in a manner which will adversely affect their original efficient operation, and uniform braking pressure is evenly applied to the driven member in a circular or annular pattern thereon, and both the amount of movement of the brake member into braking position and out of braking position needs no adjusting and is actually self adjusting. Also, the reaction torque of the brake member during the braking action is obtained directly from the assembly housing itself, and therefore the assembly is sturdy and provides for the efficient and reliable operation mentioned above.

Other objects and advantages will become apparent upon reading the following description in light of the accompanying drawings.

DETAILED DESCRIPTION OF THE PREFERRED EMBODIMENT

Figure 1:
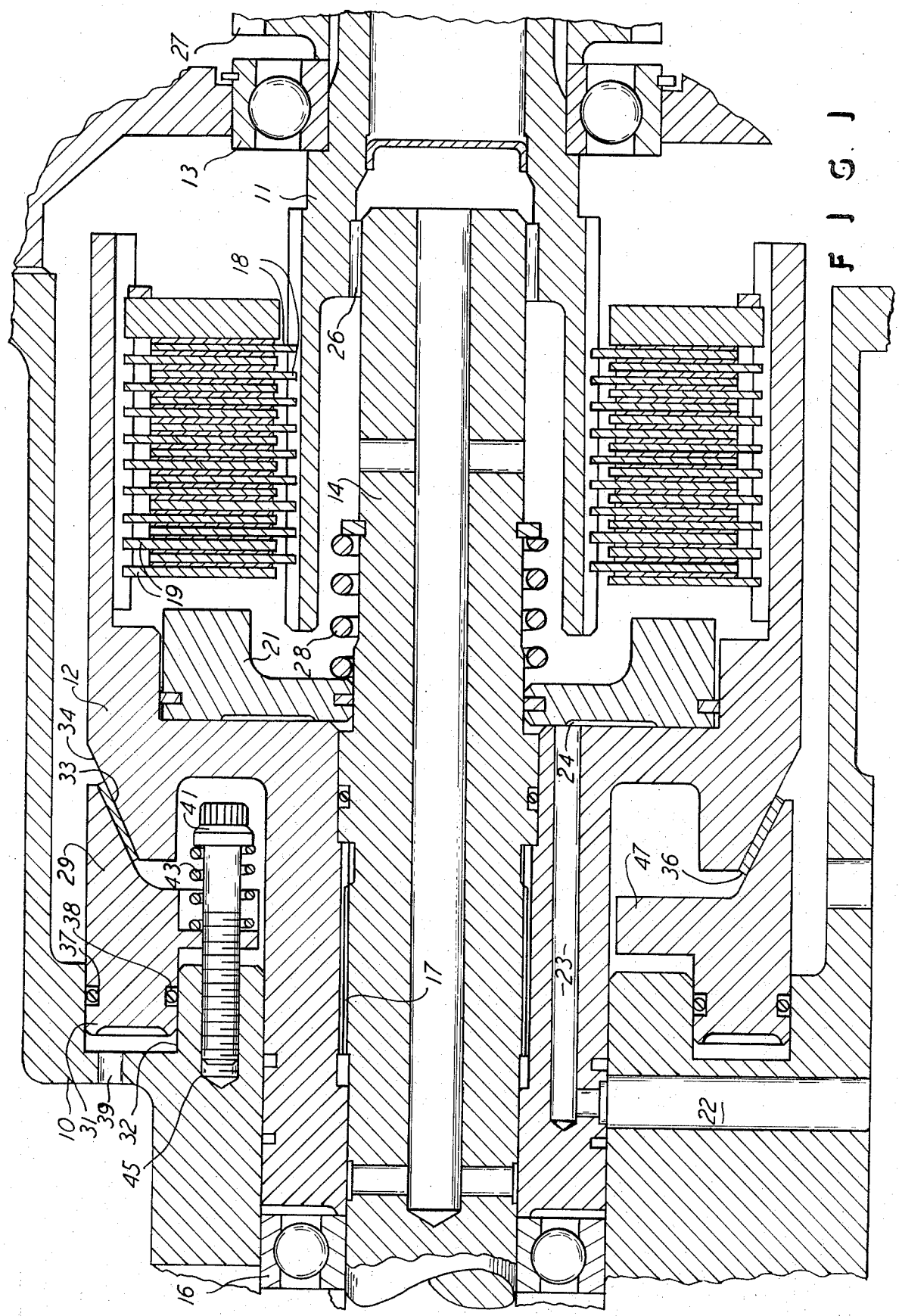
FIG. 1 is a longitudinal sectional view through a fragment of a brake and clutch assembly of this invention.

The drawings show a clutch and brake assembly having a housing 10 and a driving member 11 and a driven member 12, with the latter two members suitably rotatably mounted in the housing. Thus, a ball bearing 13 rotatably supports the input or driving member 11, and a power-take-off shaft 14 extends into the housing and is supported by a ball bearing 16 which is on the housing, and the shaft 14 is in rotational relationship with the driven member 12 by means of the spline at 17. Also, the driving member 11 has suitable clutch plates 18 affixed thereto, and the driven member 12 has clutch plates 19 suitably affixed thereto, such that, in the conventional arrangement and manner, the respective clutch plates 18 and 19 frictionally engage each other for transmitting rotational drive from the driving member 11 and to the driven member 12. To effect the clutch plate engagement mentioned, a fluid actuated piston member 21 is slidably disposed on the shaft 14, and fluid under pressure can enter the housing through the passageway 22 and the passageway 23 to reach the annular groove 24 in the clutch member 21 and thereby axially move the clutch member 21 to the right, as viewed in FIG. 1, and press the clutch plates 18 and 19 into driving relation, as mentioned. Also, a rotation bearing 26 supports the shaft 14, and thus the driving member 11 and the parts that are driven, such as the member 12 and the shaft 14, are all suitably rotatably mounted in the housing 10. A fragment of a driving gear 27 is also shown and is utilized for imparting rotation to the driving member 11. A compression spring 28 abuts the clutch piston member 21 to yieldingly urge the piston member 21 to the left, as viewed in FIG. 1, and thus disengage the clutch when the hydraulic pressure is relieved at the opening 24.

The aforementioned is substantially a conventional arrangement, and it will be understood that the parts are circularly shaped and thus extend continuously around in the locations shown in the longitudinal sectional view of FIG. 1.

Figure 2:
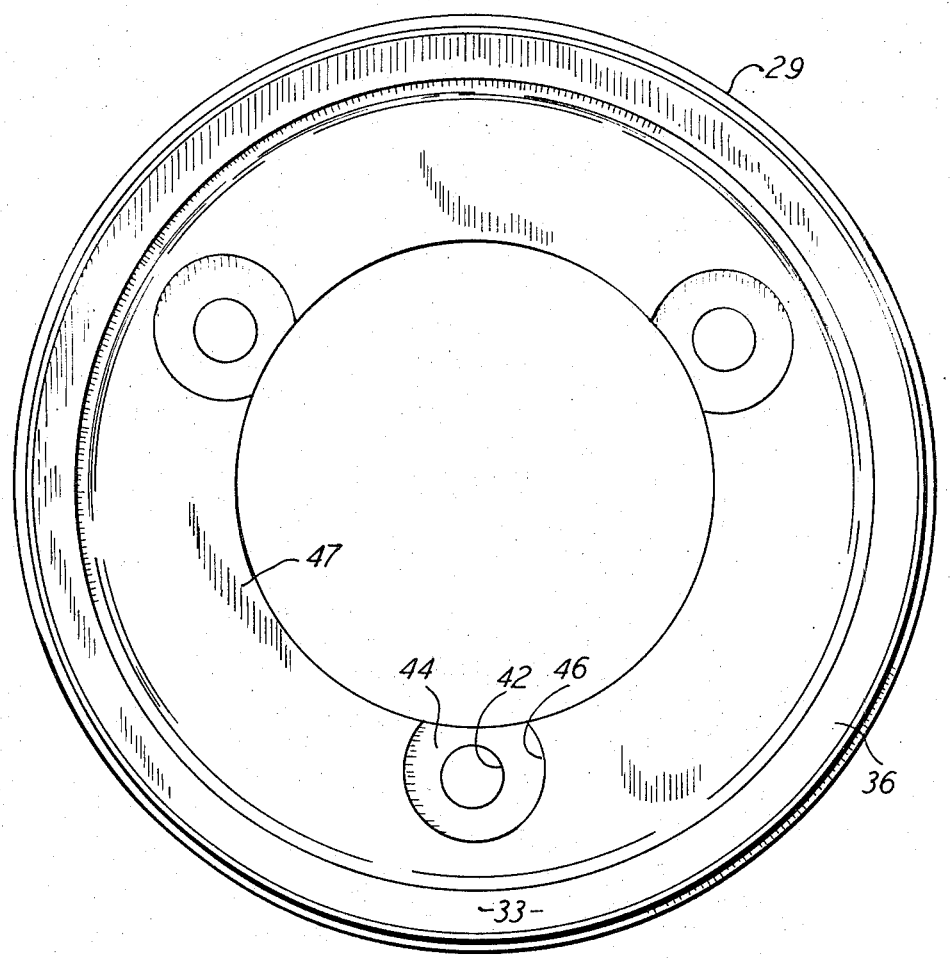
FIG. 2 is an end elevational view of the brake member shown in FIG. 1, and with the view being taken from the right hand end as it is shown in FIG. 1.

FIGS. 1 and 2 show a ring or annularly-shaped brake member 29 which is disposed within the housing 10 and has an annularly-shaped projection 31 slidably disposed in an annular pocket 32 defined by the housing 10 and the brake member 29. Thus the brake member 29 is in the nature of a piston member, and it is only movable along its longitudinal axis, that is to the left and right as viewed in FIG. 1, and it is piloted or guided in the annular groove or pocket 32 in the housing 10. The brake member 29 has an endless conically-shaped surface 33 which is adjacent to and faced toward the driven member 12, and FIG. 1 shows the brake member surface 33 in braking engagement with a similarly shaped conical surface 34 on the driven member 12. Also, the brake member 29 has an endless and conically-shaped brake lining 36 affixed to and being a part of the brake member 29, and it is the lining 36 that presents the brake surface 33 against the driven member surface 34. Also, a large fluid-sealing O-ring 37 extends around the outside of the piston brake member 29, and a smaller fluid-sealing O-ring 38 extends around the smaller circumference of the piston brake member 29, and the two O-rings 37 and 38 prevent the escape of fluid under pressure and out of the pocket 32, when pressurized fluid has been introduced into the pocket 32, through an opening, such as an opening 39, in the housing 10.

The brake member 29 is further mounted on the housing 10 by means of three bolts 41 which are evenly spaced around the brake member 29, as indicated by the three bolt hole openings 42 in FIG. 2. The three bolts 41 extend into the housing 10 through bolt hole openings 45 in the housing 10, as seen in FIG. 1. Thus, the brake member 29 is further guided on the housing 10 and is prevented from rotating relative to the housing 10 and relative to the driven member 12, by virtue of the three bolts 41. Also, compression springs 43 extend between the heads of the bolts 41 and the bottoms 44 of the pockets 46 which are provided on the brake member 29. Therefore, the brake member 29 has a radially inwardly disposed flange 47 in which the bolt holes 42 are located, as shown.

With the arrangement described, the piston-type brake member 29 is movable along its longitudinal axis to go into and out of braking contact with the driven member surface 34. Such movement is induced by fluid under pressure in the pocket 32 and also by the compressive action of the three springs 43 when the pressurized fluid is released. Of course a suitable connection and source is provided for introducing the fluid under pressure and into the annular pocket 32, and thereby a uniform braking force is provided to the ring or annularly-shaped piston-type member 29. Also, the arrangement with the springs 43 is such that they need not be manually adjusted for either permitting full braking movement of the member 29 or for retracting the member 29 from its braking position shown in FIG. 1. Still further, the braking force applied by the member 29 and to the driven member 12 is at the radially outer circular surface 34 on the driven member 12 and thus maximum braking efficiency is attained. Further, location of the retaining bolts 41 on a radially inwardly located position relative to the circular brake pad 36 provides stability and continued alignment for the brake member 29.

Therefore, with the assembly described, there is substantial momentum of the driven member 12 and its connected power-take-off shaft 14 and also the clutching piston 21 and the clutch plates 19. Accordingly, the arrangement of the brake member 29, as described, is effective overcoming the rotation of these driven parts when braking action is desired. Of course the piston 21 would be released from its pressurized clutching action when it is desired that the brake member 29 be applied to the driven member 12, in a conventional manner of alternate action between a clutch member and a brake member.

Further, in addition to the maximum radially outward location of the braking surfaces 33 and 34, as described, the surfaces are conically shaped, as described and shown, and may therefore present an efficient braking action by having one conical surface engage another in a wedging type of action. Further, with the conical arrangement, wear in not any problem, and it will be seen that the surface 34 on the driven member 12 is longer than the surface 33 of the pad 36, and thus wear and precise placement of the pad surface 33 is not a problem. Likewise, the axial length of the annular or ring-shaped housing pocket 32, as well as the axial length of the annular projection 31 of the piston member 29, gives sufficient latitude for movement of the piston member 29 relative to its engaged or braking engagement with the surface 34, and likewise the arrangement of the bolt 41 and the spring 43 is well adapted to the self positioning for the piston 29. Thus, even in the minimum position of contact between the brake pad friction surface 33 and the driven member surface 34, which minimum position is shown in FIG. 1, the springs 43 are under compression so that, when pressure is relieved in the pocket 32, the springs 43 will immediately and efficiently release the braking force by moving the brake member 29 to the left, as viewed in FIG. 1. In fact, the springs 43 are preloaded by the bolts 41 even when the member 29 is fully spaced or released from engagement with the surface 34.

What is claimed is:

1. A clutch and brake assembly comprising a housing, a driving member rotatably mounted in said housing and including a set of clutch plates, a driven member rotatably mounted in said housing and including a set of clutch plates movable into and out of driving contact with said driving member clutch plates for rotating said driven member in unison with said driving member, a clutch control member movably mounted on said driven member for moving said clutch plates into contact with each other to effect said driving contact, a brake member non-rotatably disposed in said housing adjacent said driven member, said driven member and said brake member each having a conically shaped surface faced toward each other and being positioned to contact each other when said brake member is moved toward said driven member and thereby restrain said driven member against rotation, said brake member being movably mounted on said housing for axial movement only and relative to the center longitudinal axis of said conically shaped surface, and said housing and said brake member having annular surfaces defining a fluid tight annular pocket for receiving fluid under pressure to axially move said brake member into braking contact with said driven member, and a plurality of springs spaced around said brake member and secured with said housing for yieldingly urging said brake member away from said driven member to release the braking force when the fluid under pressure is released from said pocket.

2. The clutch and brake assembly as claimed in claim 1, wherein said clutch control member and said brake member each are in nature of piston members and each have annularly shaped grooves for receiving fluid under pressure and thereby be moved to their respective operative positions, and springs operative on each of said clutch control member and said brake member to yieldingly urge them to their respective inoperative positions.

3. The clutch and brake assembly as claimed in claim 1, including an output shaft in rotatable driving relation with said driven member, said clutch control member being an annularly shaped piston mounted on said output shaft and on said driven member for rotation therewith, whereby said brake member restrains the rotation of said output shaft and said clutch control member in addition to restraining said driven member.

4. The clutch and brake assembly as claimed in claim 1, wherein said housing includes said annularly shaped pocket spaced from said driven member, said brake member being disposed in the space between said driven member and said annularly shaped pocket and including a cylindrically shaped extension slidably disposed in said annularly shaped pocket and being fluid tight with said housing.

5. The clutch and brake assembly as claimed in claim 4, including a plurality of bolts spaced around said brake member and extending therethrough in the direction away from said driven member and being threaded into said housing for restraining said brake member in rotational movement relative to said housing, and said springs being compression springs mounted on said bolts.

* * * * *